United States Patent [19]

Okada

[11] Patent Number: 5,508,711
[45] Date of Patent: Apr. 16, 1996

[54] LIQUID CRYSTAL DISPLAY APPARATUS AND DRIVING METHOD OF SUCH APPARATUS

[75] Inventor: Shinjiro Okada, Hiratsuka, Japan

[73] Assignee: Canon Kabushiki Kaisha, Tokyo, Japan

[21] Appl. No.: 182,385

[22] Filed: Jan. 18, 1994

Related U.S. Application Data

[63] Continuation of Ser. No. 681,993, Apr. 8, 1991, abandoned.

[30]     Foreign Application Priority Data

Apr. 9, 1990   [JP]   Japan ........................................ 2-94384
Apr. 5, 1991   [JP]   Japan ..................................... 3-073127

[51] Int. Cl.$^6$ ....................................................... G09G 3/36
[52] U.S. Cl. .................................................. 345/97; 345/89
[58] Field of Search .................................... 345/101, 103, 345/94, 95, 96, 97, 89, 87; 359/54, 55, 56

[56]              References Cited

U.S. PATENT DOCUMENTS

| | | | |
|---|---|---|---|
| 4,687,956 | 8/1987 | Itoh et al. ................................ | 340/784 |
| 4,701,026 | 10/1987 | Yazaki et al. ............................ | 340/784 |
| 4,712,877 | 12/1987 | Okada et al. ............................. | 340/784 |
| 4,725,129 | 2/1988 | Kondo et al. ............................... | 359/56 |
| 4,765,720 | 8/1988 | Toyono et al. ......................... | 350/350 S |
| 4,938,574 | 7/1990 | Kaneko et al. ........................... | 340/784 |
| 5,006,839 | 4/1991 | Fujita ...................................... | 340/784 |
| 5,095,377 | 3/1992 | Kobayashi et al. ..................... | 340/784 |
| 5,408,246 | 4/1995 | Inaba et al. ................................. | 345/89 |

FOREIGN PATENT DOCUMENTS 136027   6/1988   Japan .

*Primary Examiner*—Richard Hjerpe
*Assistant Examiner*—Xiao M. Wu
*Attorney, Agent, or Firm*—Fitzpatrick, Cella, Harper & Scinto

[57]                ABSTRACT

A liquid crystal display apparatus which has a display section in which a group of scan electrodes and a group of signal electrodes are arranged in a matrix shape and a ferroelectric liquid crystal having a bistability in the direction of an electric field is filled between both of said electrode groups and displays an image or information, comprising: a circuit for sequentially writing gradation information from a pixel having a high threshold value on a scan line by a pulse to completely reset all of pixels on a selected scan electrode into a first stable state and one or a plurality of pulses subsequent to said reset pulse.

10 Claims, 9 Drawing Sheets

(a) V=0    (b) V < Vth    (c) Vth < V < Vsat    (d) Vsat < V $\Delta T = 48\mu s, P2=16V, P3=15V$

32°C        30°C

P1 P2    P3    1/4 BIAS SIGNAL $\Delta T = 48\mu s$ $T_1 = 288\mu s$

P3 PULSE THRESHOLD CURVE

P2 PULSE THRESHOLD CURVE

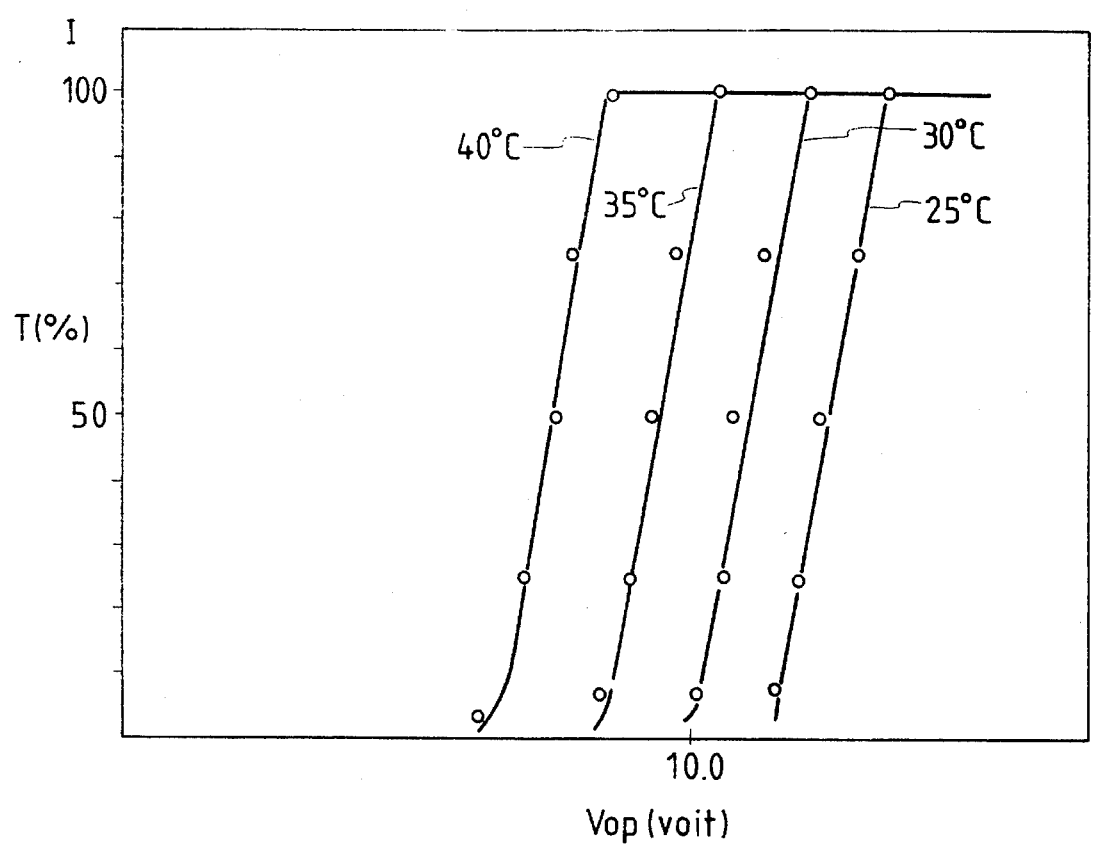

LIQUID CRYSTAL DISPLAY APPARATUS AND DRIVING METHOD OF SUCH APPARATUS

This application is a continuation of application Ser. No. 07/681,993 filed Apr. 8, 1991, now abandoned.

BACKGROUND OF THE INVENTION

1. Field of the Invention

The present invention relates to a matrix driving method of a liquid crystal display apparatus using a ferroelectric liquid crystal and, more particularly, to a liquid crystal display apparatus for executing a gradation display and to a method of driving such an apparatus.

2. Related Background Art

With respect to a display device using a ferroelectric liquid crystal (FLC), as shown in JP-A-61-94023 or the like, there is known a display device in which a ferroelectric liquid crystal is injected into a liquid crystal cell constructed by confronting glass substrates in which transparent electrodes are formed on two inner surfaces so as to keep a cell gap of about one to three microns and an orientation process has been performed.

It is a feature of the display device using the ferroelectric liquid crystal that since the ferroelectric liquid crystal has a spontaneous polarization, a coupling force between an external electric field and the spontaneous polarization can be used for switching and that since the direction of the major axis of the ferroelectric liquid crystal molecule corresponds to the polarizing direction of the spontaneous polarization in a one-to-one corresponding manner, a switching operation can be performed by the polarity of the external electric field.

Since the ferroelectric liquid crystal generally uses a chiral smectic liquid crystal (SmC*, SmH*), the major axis of the liquid crystal molecule in a bulk state exhibits a twisted orientation. However, the twisted state of the major axis of the liquid crystal molecule can be eliminated by inserting the liquid crystal into the cell having a cell gap of about 1 to 3 microns as mentioned above. (N. A. Clark et al., "MCLC", Vol. 94, pages 213 to 234, 1983)

A structure of an actual ferroelectric liquid crystal cell uses a simple matrix substrate as shown in FIG. 2.

The ferroelectric liquid crystal is mainly used as a binary (white/black) display device by setting two stable states into a light transmission state and a light shielding state. However, a multivalue, that is, a half-tone display can be also performed. As one of the half-tone display methods, an intermediate light transmission state is produced by controlling an area ratio of a bistable state in a pixel. The above method (area modulating method) will now be described in detail hereinbelow.

FIG. 4 is a diagram schematically showing the relation between the switching pulse amplitude of the ferroelectric liquid crystal device and the transmittance. FIG. 4 is a graph in which a transmission light quantity I after a single pulse of uni-polarity was applied to a cell (element) which has originally been set in the complete light shielding (black) state has been plotted as a function of an amplitude V of the single pulse. When the pulse amplitude V is equal to or less than a threshold value $V_{th}$ ($V \leq V_{th}$), the transmission light quantity doesn't change. As shown in FIG. 5(b), the transmission state after the pulse was applied is equal to that of FIG. 5(a) showing the state before the pulse is applied. When the pulse amplitude exceeds the threshold value ($V_{th} < V < V_{sat}$), a state of a part in the pixel is shifted to the other stable state, namely, the light transmission state shown in FIG. 5(c) and exhibits an intermediate transmission light quantity as a whole. Further, when the pulse amplitude V increases and is equal to or higher than a saturation value $V_{sat}$ ($V_{sat} \leq V$), as shown in FIG. 5(d), the light transmission quantity reaches a constant value because the whole pixel is set into the light transmission state.

That is, the area modulating method intends to display a half-tone by controlling the voltage so that the pulse amplitude V lies within a range of $V_{th} < V < V_{sat}$.

However, the area modulating method has the following serious drawback as will be explained hereinafter. Since the relation between the voltage and the transmission light quantity shown in FIG. 4 depends on a thickness of cell and a temperature, in other words, if there is a cell thickness distribution or a temperature distribution in the display panel, a different gradation level is displayed for the applied pulse of the same voltage amplitude. FIG. 6 is a diagram for explaining such a drawback and is a graph showing the relation between the voltage amplitude V and the transmission light quantity I in a manner similar to FIG. 4. FIG. 6 shows two curves showing the relations at different temperatures: that is, a curve H indicative of the relation at a high temperature and a curve L indicative of the relation at a low temperature. In the display (display device) of a large display size, a temperature distribution often occurs in the same panel (display section). Therefore, even if the operator tries to display a half-tone at a certain voltage $V_{ap}$, a variation of the half-tone level occurs in a range from $I_1$ to $I_2$ as shown in FIG. 6, so that a uniform display state cannot be derived. Generally, since a switching voltage of the ferroelectric liquid crystal is high at a low temperature and is low at a high temperature and a difference between the switching voltages depends on a temperature change of a viscosity of liquid crystal, such a difference is ordinarily extremely larger than that of the conventional TN type liquid crystal device. Therefore, a fluctuation of the gradation level by the temperature distribution is fairly larger than that of the TN liquid crystal. Such a point becomes the maximum cause which makes it difficult to realize the gradation display of the ferroelectric liquid crystal device.

The above influences increase as an area of the liquid crystal cell increases (a variation of the cell thickness and a variation of the temperature easily occur), so that the gradation, especially, the analog gradation display in the cell of a large area using the FLC is impossible.

SUMMARY OF THE INVENTION

It is an object of the invention to provide a liquid crystal display apparatus and its driving method, in which the analog gradation display can be realized by an FLC device and the stable gradation display can be also performed for a threshold value fluctuation due to a variation of temperature in a cell and a variation of thickness of the cell.

To accomplish the above object, according to the invention, there is provided a liquid crystal display apparatus which has a display section in which a group of scan electrodes and a group of signal electrodes are arranged like a matrix and a ferroelectric liquid crystal having a bistability in the direction of an electric field is filled between both of the electrode groups and which displays an image or information, wherein the apparatus has means for sequentially writing gradation information from a pixel of a higher threshold value on a scan line by a pulse to completely reset all of the pixels on the selected scan electrode into a first stable state and one or a plurality of pulses subsequent to the reset pulse. There is also provided a method of driving such a liquid crystal display apparatus.

On the other hand, according to the invention, there is provided a liquid crystal display apparatus which has a display section in which a group of scan electrodes and a group of signal electrodes are arranged like a matrix and a ferroelectric liquid crystal having a bistability in the direction of an electric field is filled between both of the electrode groups and which displays an image or information, wherein the apparatus has drive control means for writing into a pixel of a high threshold value on a scan line by applying a pulse to completely reset all of the pixels on a scan line by the selected scan electrode into a first stable state and to subsequently shift to a second stable state, and for further changing a display state of the pixel of another lower threshold value while keeping the writing state of the pixel of the high threshold value, thereby enabling a half-tone display to be performed. There is also provided a method of driving such a liquid crystal display apparatus.

Further, according to the invention, there is provided a liquid crystal display apparatus having applying means which is expressed by the relations $$V_{sat(max)} \leq V_1$$

$$V_{th(max)} < V_2 < V_{sat(max)}$$

$$V_{th(min)} \leq V_3 < V_{th(max)}$$

where, $V_{th(max)}$: maximum value of the threshold voltage in the display section of the liquid crystal display apparatus, $V_{sat(max)}$: maximum value of the saturation voltage, $V_{th(min)}$: minimum value of the threshold voltage, $V_1$: amplitude of the pulse which is applied to reset in the first step, $V_2$: amplitude of the pulse which is applied to shift the level in the second step, $V_3$: amplitude of the pulse which is applied to change the display state of the low threshold part in the third and subsequent steps.

There is also provided a method of driving such a liquid crystal display apparatus.

BRIEF DESCRIPTION OF THE DRAWINGS

FIG. 13 is a diagram for explaining the second embodiment of the invention.

DETAILED DESCRIPTION OF THE PREFERRED EMBODIMENTS

A writing method of the invention will be described by using graphs in accordance with a practical procedure.

Figure 1A:
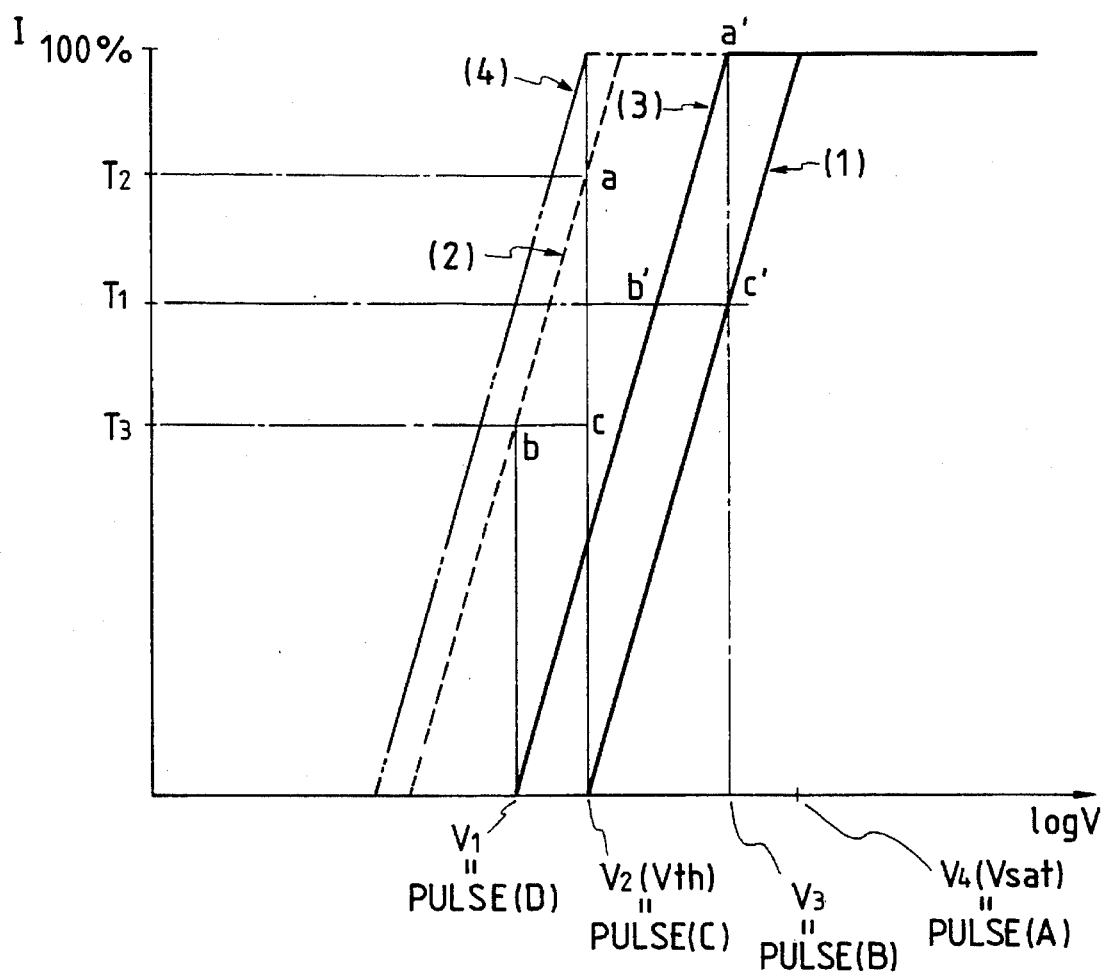
FIGS. 1A and 1B are diagrams for explaining driving means in the invention.

FIG. 1A shows a threshold curve of an FLC. An axis of ordinate shows the transmittance I (0 to 100%) and an axis of abscissa indicates a pulse voltage value by a logarithm scale.

A solid line (1) in FIG. 1A shows a threshold curve of a high threshold part in the panel. A broken line (2) shows a threshold curve of a fluctuation part of the threshold value. In both of the curves (1) and (2), a pulse width is set to $\Delta T$.

A solid line (3) shows a threshold curve when a gradation signal voltage $V_3$ is set to a voltage ($V_{sat}$) at which a transmittance is equal to 100%. An inclination is the same as those of the curves (1) and (2).

An alternate long and two short dashes line (4) shows a threshold curve having the same inclination as those of the curves (1) and (2) in the case where $V_2$ is set to $V_{sat}$.

Figure 1B:
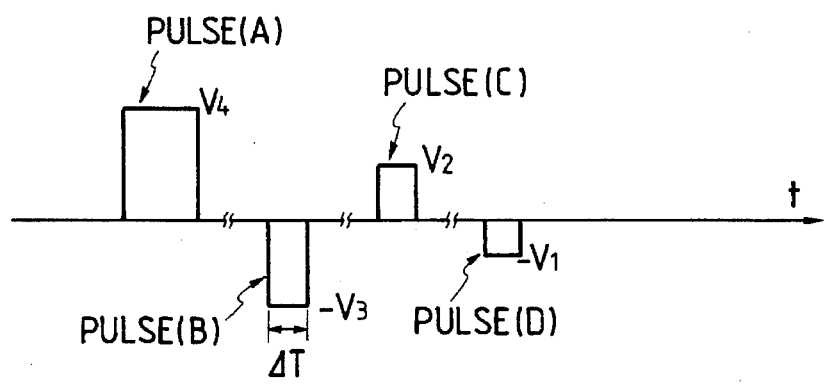

For explanation, pulses which are applied to the pixel are set as shown in FIG. 1B and the time correlation among the pulses is omitted.

The writing operation comprises the following four steps.

① The whole panel is written into a certain state $Q_0$ by a pulse (A) of a voltage $V_4$ (whole surface reset).

② The high threshold part in the panel is written by a pulse (B) of a polarity opposite to that of the pulse (A) until the transmittance is equal to $T_1$. At this time, the portion in which the threshold value has been fluctuated to a low value is completely inverted (which will be explained by intersection points c' and a' of an alternate long and short dash line and the solid lines (1) and (3) in FIG. 1A). Due to this, the high threshold part is written into a gradation state $Q_1$ of $T_1$. However, since the whole surface in the low threshold part has been inverted, this means that it is again inverted to $\overline{Q_0}$ (Table 1). Assuming that the transmittance of the state $Q_0$ is equal to 0%, the transmittance of $\overline{Q_0}$ is equal to 100% and the transmittance of $\overline{Q_1}$ is equal to $T_1$ %.

TABLE 1

| Applied pulse | (A) | (B) | (C) | (D) |
|---|---|---|---|---|
| State of high threshold part | $Q_0$ | $Q_1$ | $Q_1$ | $Q_1$ |

TABLE 1-continued

| Applied pulse | (A) | (B) | (C) | (D) |
|---|---|---|---|---|
| State of low threshold part | $Q_0$ | $\overline{Q_0}$ | $Q_2$ | $Q_1$ |

③ Subsequently, by applying a pulse (C) of a polarity opposite to that of the pulse (B), the low threshold part is again inverted until the transmittance is equal to $(100-T_2)$ %. At this time, no switching occurs in the high threshold part shown by the threshold curve (1).

Therefore, the high threshold part keeps the state $Q_1$ formed by the pulse (B). On the other hand, the low threshold part is inverted from the state of $\overline{Q_0}$ (transmittance of 100%) to the state $Q_2$ of the transmittance of $(100-T_2)$ %.

④ By applying a pulse (D) of a polarity opposite to that of the pulse (C), the high threshold part keeps the state $Q_1$ formed by the pulse (B). However, the low threshold part is again inverted from the state $Q_2$ until the transmittance is equal to $(100-T_2+T_3)$ % in FIG. 1A.

At this time, in the low threshold part, the state $Q_1$ of the same transmittance as that of the high threshold part is realized.

That is, as will be understood in FIG. 1A, the transmittance $T_1$ % is equal to $(100-T_2+T_3)$ %. This point will be also easily understood because triangles abc and a'b'c' which are formed in the diagram are congruent.

Figure 3:
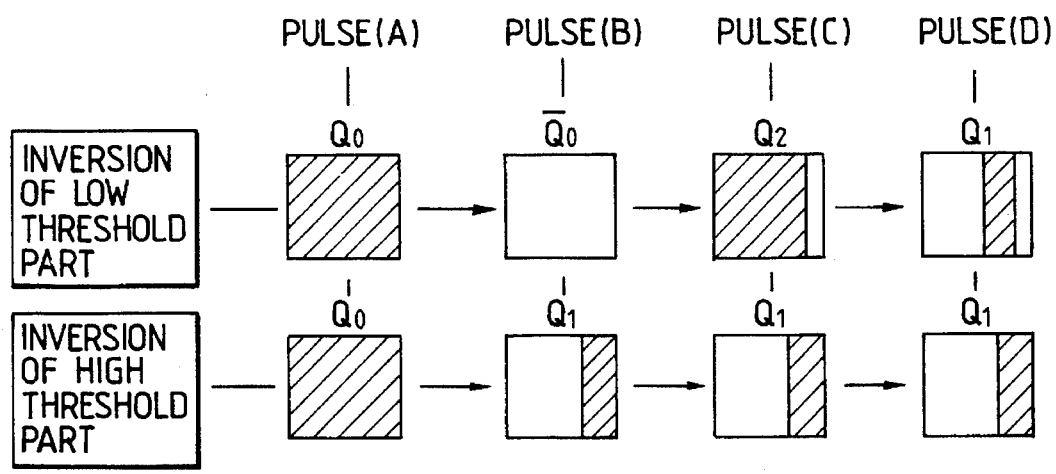
FIG. 3 is a diagram for explaining a display state in the case where the driving means of the invention is used.
Figure 4:
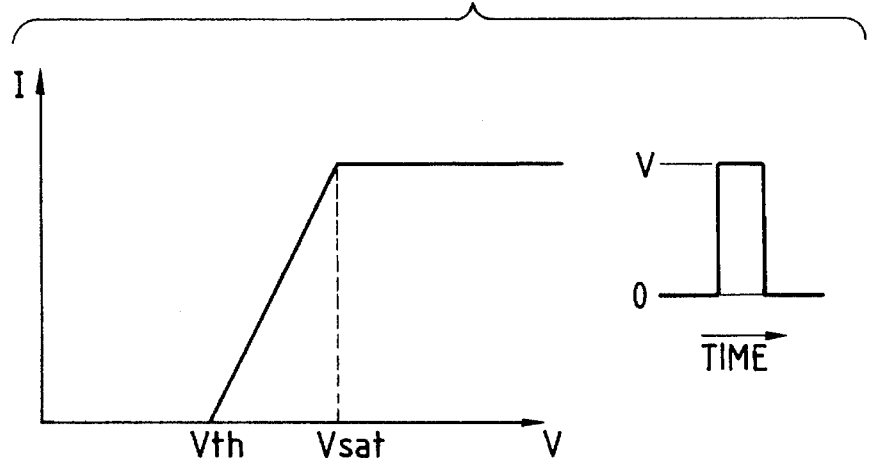
FIG. 4 is a schematic graph showing the relation between a switching pulse amplitude and a transmittance with respect to a ferroelectric liquid crystal.
Figure 5:
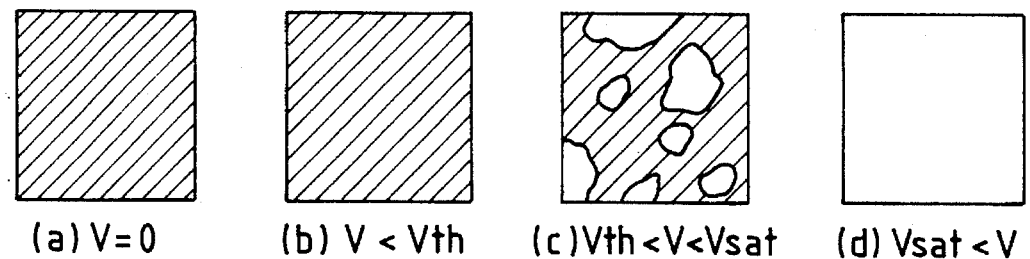
FIG. 5 is a schematic diagram showing a light transmission state of a ferroelectric liquid crystal display device according to an applied pulse.
Figure 6:
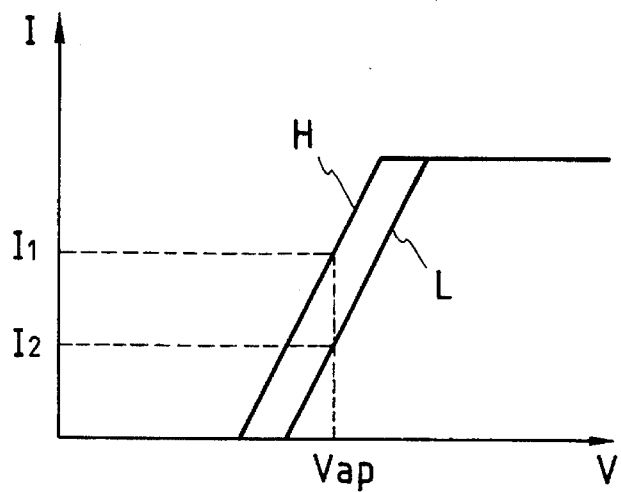
FIG. 6 is a diagram showing the relations between a voltage amplitude V and a transmission light quantity I at high and low temperatures.

Table 1 shows a change in State by the supply of time-sequential pulses as mentioned above and FIG. 3 shows an image diagram of such a state.

There are the following relations among the pulses (A), (B), (C), and (D) which are applied in accordance with the above procedure.

① First, in order to provide an enough resetting function, the pulse (A) has a threshold value $V_4$ of the whole surface inversion by the pulse having a width of $\Delta T$. However, fundamentally, no problem occurs even if the pulse width of the pulse (A) is set to $\Delta T$. For the pulse having a pulse width of $\Delta T$ (the same shall also apply hereinbelow), the voltage of $V_4$ is equal to the total inversion voltage $V_{sat}$ between pixels in the high threshold part as shown in FIG. 1A.

② $V_2$ is equal to the partial inversion voltage $V_{th}$ in the pixel in the high threshold part.

③ Therefore, under the condition such that the inclinations on the threshold value curves are equal, there are the following relations $$V_2 = \xi V_4 = \xi V_{sat}$$

when it is assumed that $$V_{th}/V_{sat} = \xi$$

④ $V_3$ is equal to the partial inversion information voltage in the pixel in the high threshold part, that is, the voltage to write the gradation state and there are the relations of $V_2 \leq V_3 \leq V_4$. To obtain the transmittance of I %, $V_3$ can be written as follows.

$$\frac{\log V_3 - \log V_2}{\log V_4 - \log V_2} = \frac{I}{100} \equiv n$$

$$\log V_3/V_2 = n \cdot \log V_4/V_2$$

$$\log (V_3/V_2) = -n \cdot \log \xi$$

$$V_3 = V_2/\xi^n$$

$$V_3 = V_4 \xi^{n-1}$$

$$= V_{sat}/\xi^{n-1}$$

⑤ $V_1$ can be regarded to be a voltage value corresponding to $V_{th}$ of the threshold curve in which $V_3$ is equal to $V_{sat}$ and can be expressed as follows.

$$V_1 = \xi V_3$$

$$V_1 = V_4/\xi^{n-2}$$

$$= V_{sat}/\xi^{n-2}$$

As mentioned above, the pulses (A), (B), (C), and (D) which are sequentially applied are all determined by the following three factors.

(a) $V_{sat}$ of the high threshold part (b) Constant $\xi$ ($=V_{th}/V_{sat}$) which is decided on the threshold value characteristic (c) Constant n ($=I \%/100\%$) which is determined by the gradation information That is, $$\begin{cases} |V_1| = V_{sat}/\xi^{n-2} \\ |V_2| = \xi V_{sat} \\ |V_3| = V_{sat}/\xi^{n-1} \\ |V_4| \geq V_{sat} \end{cases}$$

The reason why an inequality sign has been added to $V_4$ is because it is sufficient to completely invert and the voltage $V_4$ is not limited by an equality sign.

The gradation expression can be realized by the pulses (A), (B), (C), and (D). A fluctuation range of the threshold value which is now considered is a region sandwiched by the threshold curves (4) and (1) in FIG. 1A.

This is because if an area such that $V_{sat}$ is set to a voltage of $V_2$ or less exists, even when the pulse (C) is applied, it is impossible to distinguish from the area such that $V_{sat}$ is equal to $V_2$ and all of the parts are completely inverted, however, when the pulse (D) is applied, the different inversions are executed, so that a constant gradation level cannot be displayed.

On reflection, however, it will be understood that the relation between the pulses (C) and (D) is the same as the relation between the pulses (A) and (C) near the threshold curve (3).

This means that by adding a pulse (E) and, further, a pulse (F) and the like after the pulse (D), a region of further low threshold curve can be also incorporated. Assuming that peak values of the pulses (E) and (F) are set to $V_5$ and $V_6$, they can be expressed as follows.

$$V_5 = \xi \cdot V_2 = \xi^2 \cdot V_{sat}$$

$$V_6 = \xi \cdot V_1 = V_{sat}/\xi^{n-3}$$

The above relations will now be generalized and considered. When suffixes are rewritten such as $V_1, V_2, V_3, \ldots$ from the pulse which is time-precedent, the pulses can be expressed as follows.

$$Vi = \begin{cases} V_{sat} \cdot \xi^{(i-1)/2} & (i: \text{odd number}) \\ V_{sat} \cdot \xi^{n-(i/2)} & (i: \text{even number}) \end{cases}$$

$$(\xi = V_{th}/V_{sat})$$

Such a writing method is effective so long as a low threshold part such as to exceed $V_{th}$ by only the applied information signal doesn't appear upon matrix driving.

For instance, in the case of ¼ bias (the information signal of a voltage which is ¼ of the selected voltage is used), since there is a relation of $$V_{th}' > \tfrac{1}{4} V_{sat}$$

$V_{sat}'$ corresponding to the minimum $V_{th}'$ is $$V_{sat}' = V_{th}'/\xi > \tfrac{1}{4} V_{sat}^2/V_{th}$$

Therefore, when the writing voltage is expressed by $V_{sat}'$, it is possible to drive in a range of $$V_{sat} > V_{sat}' > V_{sat}^2/4V_{th}$$

According to the invention, it is desirable to construct the pixel such that the inclination $\alpha T/\alpha \log(V_{sat}/V_{th})$ on the threshold curve is set to be constant.

It is also possible to correct the peak value in dependence on the relation (in the case where a large pulse of the opposite polarity exists just before the write pulse and the case where such a pulse doesn't exist; in the case where a large voltage pulse of the opposite polarity exists just after the write pulse and the case where such a pulse doesn't exist; and the like) before and after the pulse which is applied to the FLC.

Generally, such a correction can be realized by adding a correction coefficient.

$$V_{0i}' = \alpha \xi^i V_{sat}, \quad V_{1j}' = \alpha \xi^i V_1$$

($\alpha$=constant)

However, for instance, in the case where the write pulses continue, the threshold value of the subsequent pulse fluctuates by the existence of the preceding pulse. Therefore, in order to easily set the voltage, it is preferable to provide an interval between the write pulses. It is desirable to set such an interval to 100 μsec or more.

Although the invention has been described above with respect to the case of displaying the analog gradation, in the case of executing a discrete gradation display (digital gradation display), an enough effect is derived even if the inclinations of the threshold curves are slightly different.

In the case of executing such a digital gradation display, it is possible to use a method whereby the value of $\xi$ is corrected and the number of pulses is increased.

Further, although the invention has been described with respect to the case where the pulse width is set to be constant and the voltage modulation is used, even in the case where the voltage value is set to be constant and the pulse width is made variable, the gradation display in which the influences by the temperature change and the cell thickness change are remarkably reduced can be executed by the similar means.

An embodiment will now be described hereinbelow.

[Embodiment 1]

FIGS. 2A, 2B, 7A to 7D, 8, 9, and 10 are diagrams for explaining an embodiment.

Figure 2A:
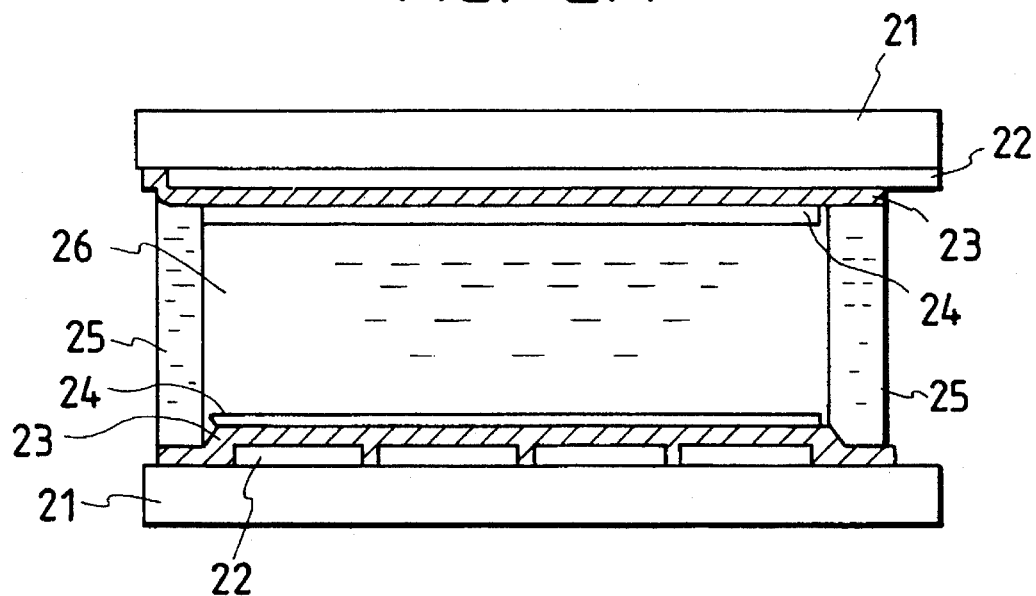
FIGS. 2A and 2B are diagrams showing a structure of a liquid crystal display device according to the first embodiment of the invention.
Figure 2B:
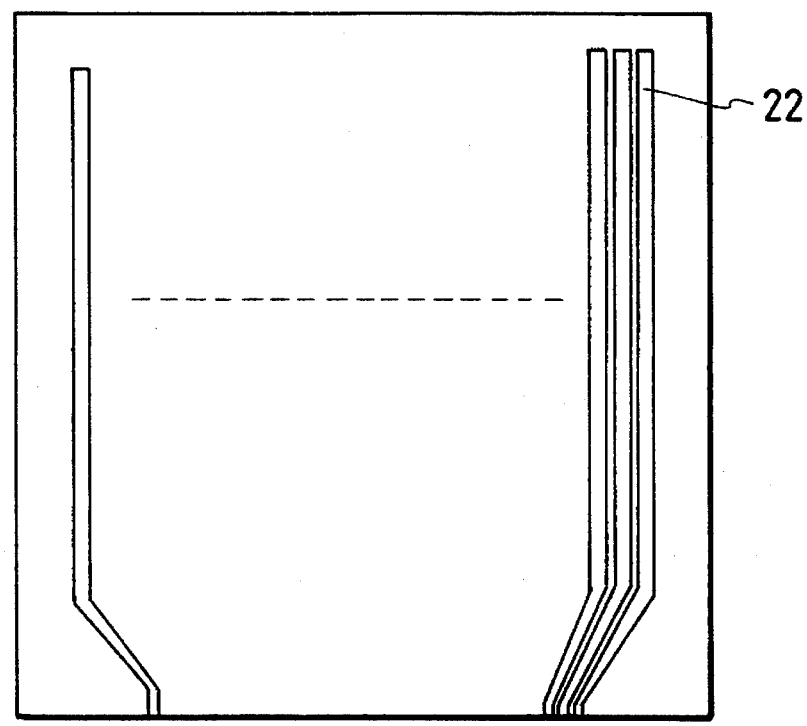

FIGS. 2A and 2B show a liquid crystal cell according to the embodiment.

Figure 7A:
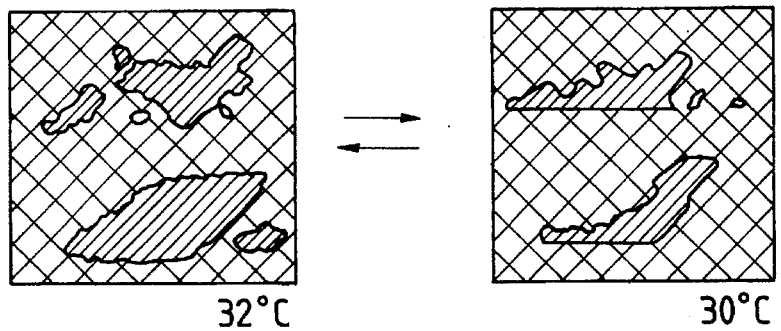
FIGS. 7A to 7D are diagrams for explaining the first embodiment of the invention.
Figure 7B:
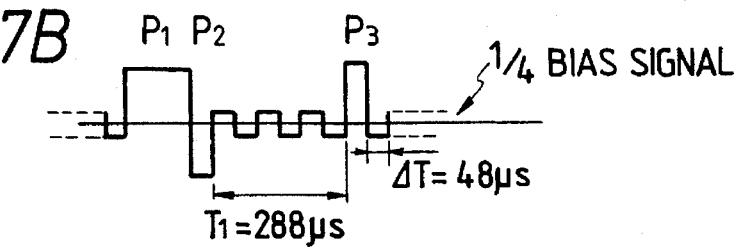
Figure 7C:
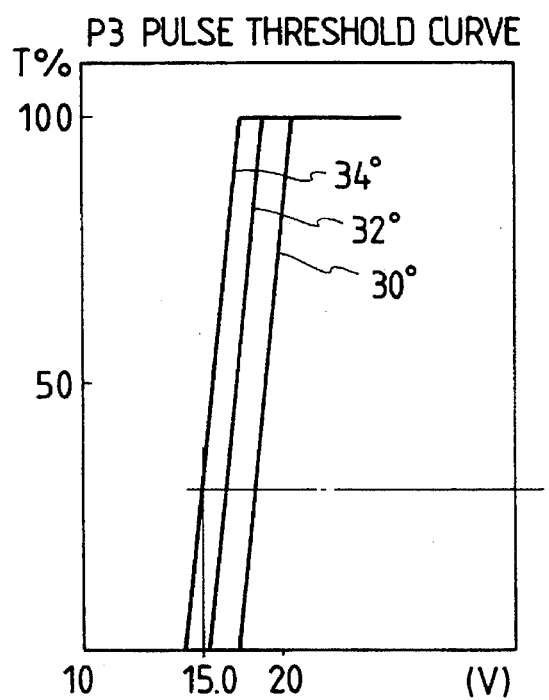
Figure 7D:
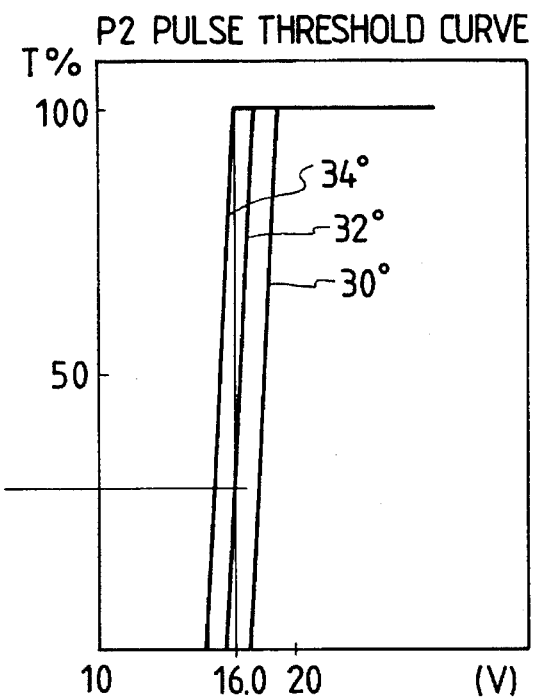

FIG. 7A shows an example of the gradation display of the embodiment. FIG. 7B shows driving waveforms of the embodiment. FIGS. 7C and 7D show threshold curves of a pixel in a panel used in the embodiment.

Figure 8:
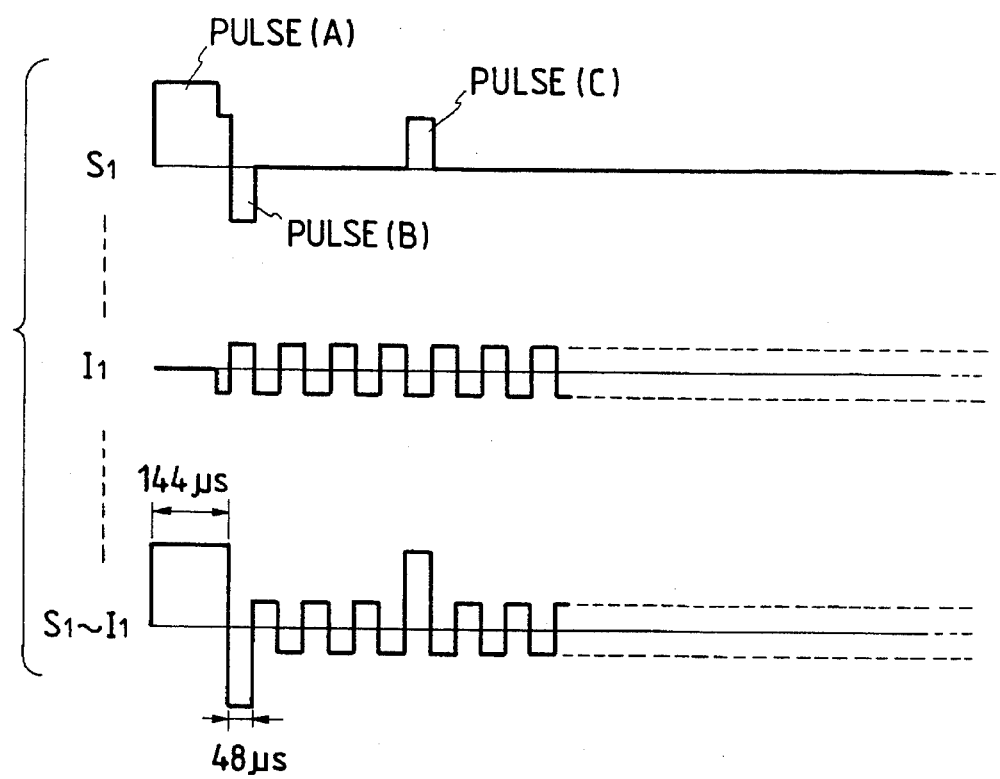
FIG. 8 is a diagram showing an example of a scan signal, an information signal, and an applied voltage to a pixel according to the first embodiment of the invention.

FIG. 8 shows an example of a scan signal, an information signal, and an applied voltage to the pixel which were used in the embodiment. In the diagram, waveforms shown by $S_1$ to $I_1$ correspond to the driving waveforms of FIG. 7B.

Figure 9:
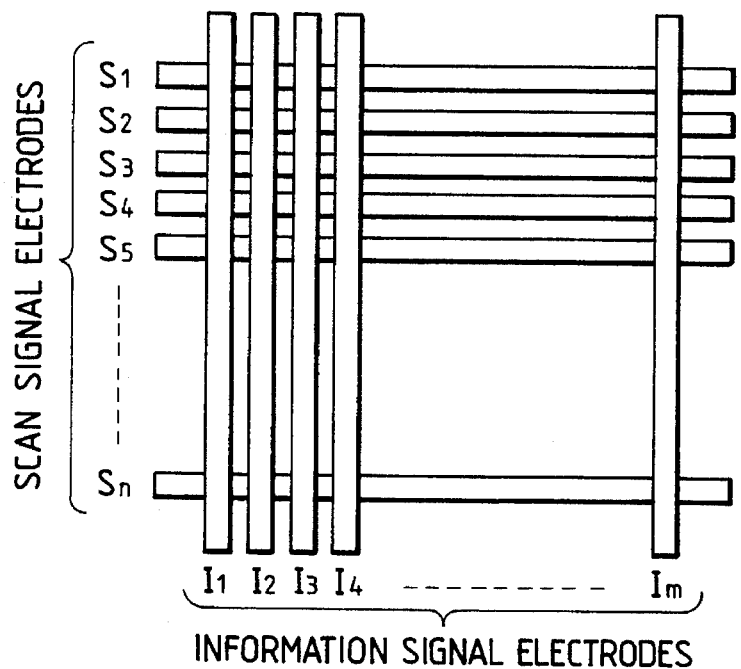
FIG. 9 is a diagram showing a construction of scan signal electrodes and information signal electrodes used in the embodiment.

FIG. 9 is a diagram showing a construction of scan signal electrodes and information signal electrodes used in the embodiment.

Figure 10:
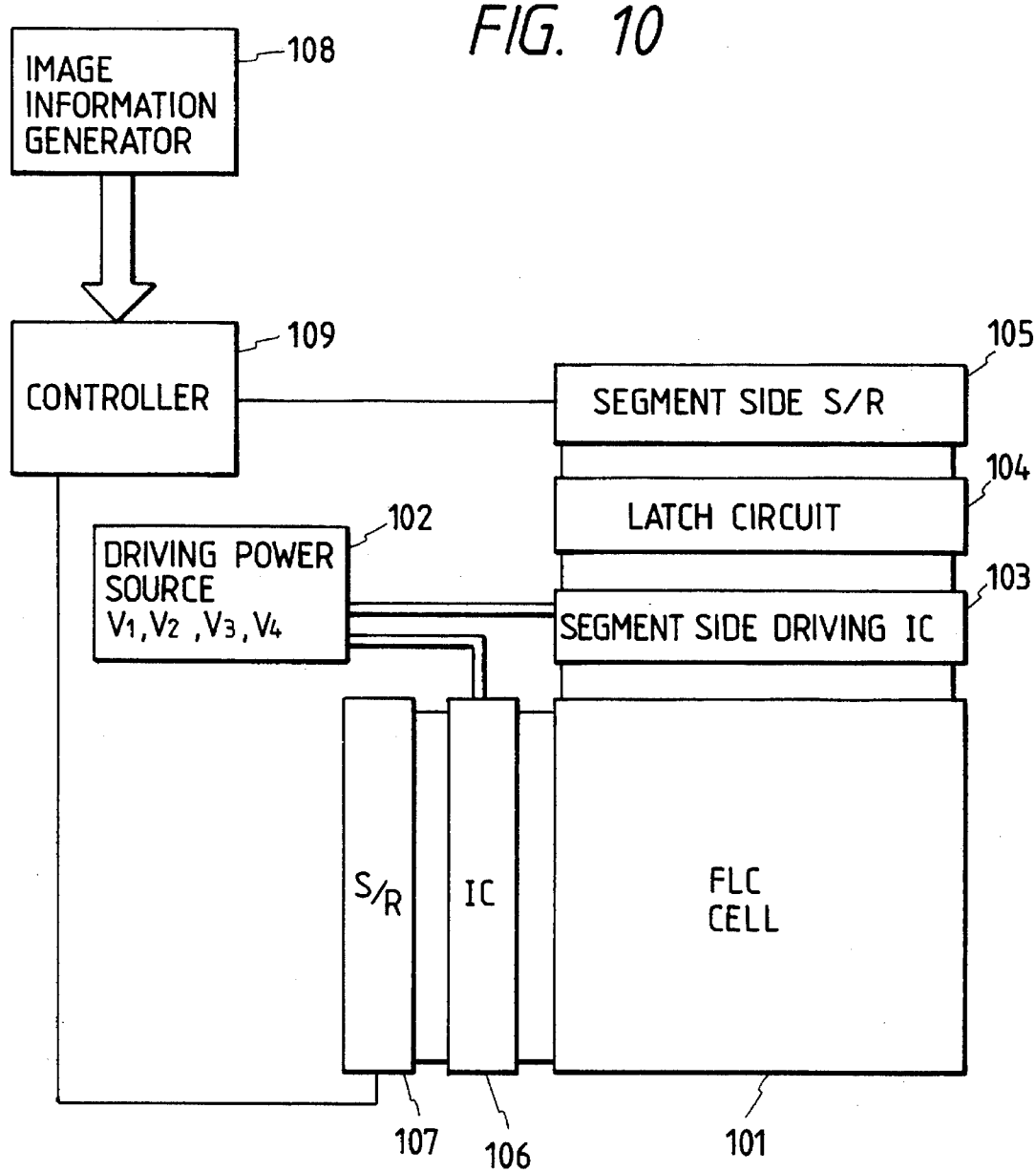
FIG. 10 is a block diagram showing a circuit of a liquid crystal display apparatus used in the embodiment.

FIG. 10 is a block diagram showing a circuit of a liquid crystal display apparatus used in the embodiment.

Figure 11:
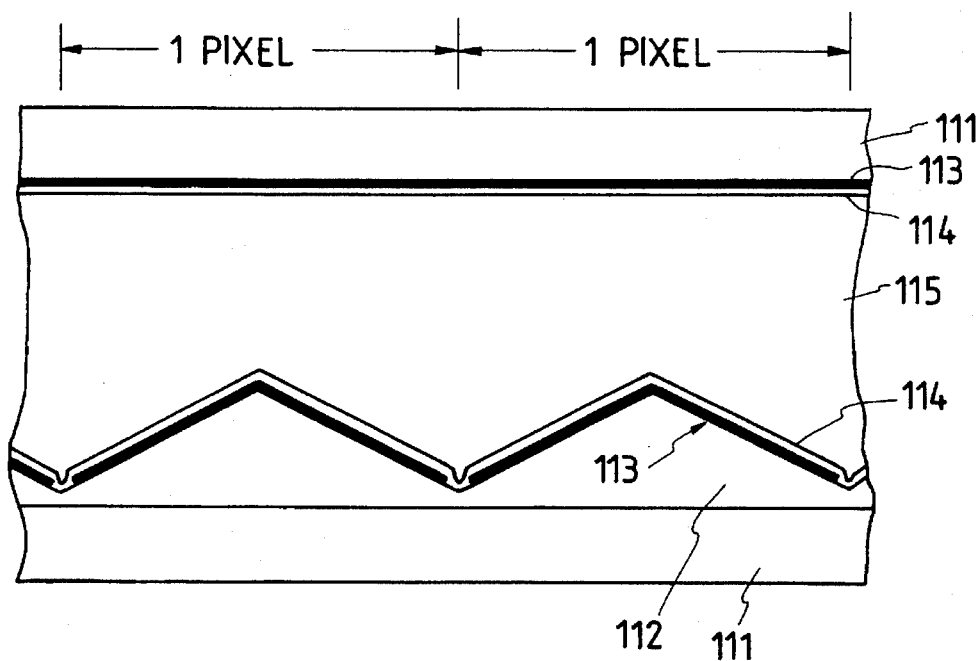
FIG. 11 is a cross sectional view of a liquid crystal cell according to the second embodiment of the invention.

FIG. 11 shows a cross sectional view of a liquid crystal cell used in the embodiment.

FIG. 9 shows a construction of the scan signal electrodes and information signal electrodes used in the embodiment. Signal waveforms which are applied to those electrodes are shown in FIG. 8.

In FIG. 8, $S_1$, $S_2$, and $S_3$ show time charts of scan signal waveforms which are successively applied to the selected scan signal electrodes and are constructed by three pulses (pulses A, B, and C). $I_1$ and $I_2$ show time charts of information signal waveforms which are applied to the group of information signal electrodes. Only parts of those signal waveforms are shown in the diagram for simplicity of explanation.

FIG. 10 shows a block diagram of a circuit to supply those signals to the liquid crystal cell. In FIG. 10, reference numeral 101 denotes a liquid crystal cell (FLC cell); 102 a driving power source which can generate voltages of various levels; 103 a segment side driving IC; 104 a latch circuit; 105 a segment side shift register; 106 a common side driving IC; 107 a common side shift register; 108 an image information generator; and 109 a controller.

In the circuit construction of FIG. 10, as a method of executing a gradation display (a plurality of voltage levels are supplied as signals), there is used a method whereby a D/A converter is provided in the segment side driving IC and a digital gradation signal which is supplied through the latch circuit is converted into an analog signal and applied to the information electrodes. In this case, the common side driving IC forms the scan signal by a distributing method by an analog switch of the driving power source.

In the embodiment, the liquid crystal cell shown in FIGS. 2A and 2B is used as an FLC cell 101. FIG. 2A is a cross sectional view of the liquid crystal cell. Reference numeral 21 denotes a glass substrate; 22 an ITO stripe electrode; 23 an insulating film made of $SiO_2$; 24 an orientation film made of polyimide; 25 a sealing material; and 26 a liquid crystal. FIG. 2B shows a pattern of the stripe electrodes on the substrate of one side.

In the cell, the $SiO_2$ layer 23 is formed as an insulating film onto the ITO stripe electrodes 22, LQ-1802 (trade name) made by Hitachi Chemical Co., Ltd. is coated onto the insulting film, the orientation film 24 is formed by executing a rubbing process to both of the upper and lower substrates, a liquid crystal A having physical properties shown in Table 2 is used as a liquid crystal 26, and a substrate interval of about 1.49 μm is held. The resultant cell is used.

TABLE 2

Liquid crystal A $$\text{Iso} \underset{81.8°C.}{\overset{82.3°C.}{\rightleftarrows}} \text{Ch} \underset{77.3°C.}{\overset{76.6°C.}{\rightleftarrows}} \text{SmA} \underset{}{\overset{54.8°C.}{\rightleftarrows}} \text{SmC*}$$

$$-2.5°C. \updownarrow -20.9°C.$$

Cryst

| | |
|---|---|
| Ps = 5.8 nC/cm² | 30° C. |
| Tilt angle = 14.3° | 30° C. |
| Δε ~ 0 | 30° C. |

FIGS. 7C and 7D show threshold curves of the pixel in the panel.

In FIGS. 7C and 7D, since the voltage is plotted by the logarithm scale, there is a relation among the threshold curves such that they are moved in parallel at 30° C., 32° C., and 34° C.

However, it will be understood that the inclination of the threshold curve of a $P_2$ pulse in FIG. 7D slightly differs from the inclination of the threshold curve of a $P_3$ pulse in FIG. 7C. A cause of such an inclination difference is based on the states before and after the pulse (the existence of a $P_1$ pulse just before the $P_2$ pulse).

At 32° C., the threshold voltage $V_{th}$ and saturation voltage $V_{sat}$ for the $P_2$ and $P_3$ pulses are as follows, respectively.

For the $P_2$ pulse: $V_{th}$=15.4 V, $V_{sat}$=17.3 V

For the $P_3$ pulse: $V_{th}$=15.1 V, $V_{sat}$=18.55 V

In the device having such characteristics, by setting the voltages of the $P_1$ and $P_2$ pulses to 16 V and the voltage of the $P_3$ pulse to 15 V, the gradation display as shown in FIG. 7A can be performed by the three pulses $P_1$ to $P_3$.

A pulse width of $P_1$ was set to 144 μsec and pulse widths of $P_2$ and $P_3$ were set to 48 μsec.

In the cell of the embodiment, a value of ξ (=threshold voltage/saturation voltage) which is necessary to design the waveform is as follows.

ξ=15.4/17.3=0.89

However, since the inclinations of the threshold curves based on the $P_2$ and $P_3$ pulses differ, ξ must be corrected.

ξ'=ξ×β=15.1/18.55=0.81

β=0.914 (correction coefficient)

For instance, to obtain the transmittance of 33%, n=33/100=0.33

$P_2$ pulse voltage:
$V_{P2}$=17.3/(0.89)$^{0.33-1}$
=16 V (=$V_{sat}/\xi^{n-1}$)

$P_3$ pulse voltage:
$V_{P3}$=ξ'×18.55
=15.1 V (=ξ×$V_{sat}$)

Any other transmittances can also calculate the conditions which are necessary to realize. The gradation display could be preferably performed by the method of the embodiment.

[Embodiment 2]

FIG. 11 shows a cross sectional view of the liquid crystal cell used in the embodiment.

The liquid crystal cell having a cross sectional structure shown in FIG. 11 is used as an FLC cell 101. That is, after an UV hardening resin was coated onto a glass substrate 111 on the lower side into a predetermined shape as shown in the diagram, it is hardened by irradiating an ultraviolet ray, thereby changing a cell thickness. An ITO transparent electrode 113 is further formed on the resin 112. After an insulating layer of $Ta_2O_5$ was formed on the ITO transparent electrode by sputtering, LP-64 (trade name) made by Toray Industries Inc. is coated as an orientation film 114, thereby forming the substrate on the lower side. On the other hand, processes similar to those of the lower substrate are executed to the glass substrate on the upper side except that the UV hardening resin 112 is not coated. As an orientation process, the rubbing process is performed to the orientation films of the upper and lower substrates in a predetermined direction, thereby forming the upper substrate. The rubbing directions of the upper and lower substrates are set so as to rotate clockwise by about 10° from the rubbing direction of the lower substrate to the rubbing direction of the upper substrate when they are seen from the surface of the cell. A liquid crystal B having physical properties shown in Table 3 was used as a liquid crystal 115.

TABLE 3

Liquid crystal B $$\text{Iso} \underset{84.9°C.}{\overset{85.4°C.}{\rightleftarrows}} \text{Ch} \underset{72.6°C.}{\overset{71.2°C.}{\rightleftarrows}} \text{SmA} \underset{59.4°C.}{\overset{58.5°C.}{\rightleftarrows}} \text{SmC*}$$

$$-18.1°C. \updownarrow -23.5°C.$$

Cryst

| | |
|---|---|
| Ps = 6.2 nC/cm² | 30° C. |
| Tilt angle ~ 22° | 30° C. |
| Δε ~ −0.1 | 30° C. |

The pixel of the embodiment has a construction as shown in FIG. 11 and has a cell thickness distribution in one pixel, so that it has a threshold distribution in one pixel.

Figure 12:
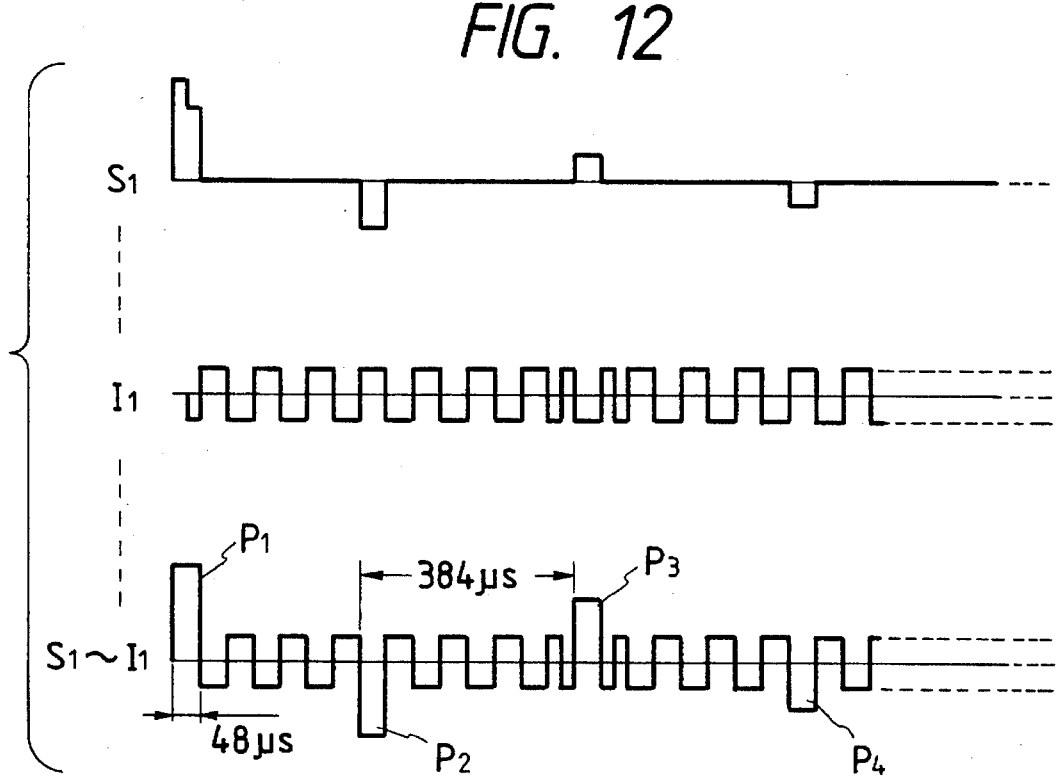
FIG. 12 is a diagram showing an example of a scan signal, an information signal, and an applied voltage to a pixel according to the second embodiment of the invention.

In the driving method used in the embodiment, all of the pulse widths of the voltages which are applied to the pixel are set to the same value (48 μsec), a pulse interval is set to 100 μsec or more, and the pixel is driven by four pulses (FIG. 12).

By driving the liquid crystal display apparatus under the conditions similar to those of the embodiment 1 except the above point, threshold curves as shown in FIG. 13 were obtained for different temperatures. The shapes of the threshold curves are the same for all of the pulses in a manner such that the threshold curves are moved almost in parallel.

In the embodiment, as shown in FIG. 12, a pulse having a width of 48 μsec was used and a pulse interval was set to 384 μsec. By resetting the pulse voltage value by the first pulse ($P_1$) of 18 V and by setting the pulse voltage values of the second pulse ($P_2$), third pulse ($P_3$), and fourth pulse ($P_4$) to 13.8 V, 12.0 V, and 9.6 V, respectively, the transmittance of about 40% could be stably realized at temperatures within a range from 27.5° C. to 31° C.

Any other transmittances can be also realized by the method and construction of the embodiment in a manner similar to those mentioned above.

By using the liquid crystal display apparatus and its driving method of the invention, the following effects are obtained.

① In the liquid crystal display apparatus using the ferroelectric liquid crystal, the analog gradation display can be realized.

② The very stable gradation display can be performed for threshold value changes such as temperature change, cell thickness change, and the like.

What is claimed is:

1. A liquid crystal apparatus comprising:
   (a) a liquid crystal panel having
      a matrix of electrodes composed of a group of scan electrodes and a group of signal electrodes, said groups being arranged in a spaced and crossed relationship to define pixels at crossed portions of the scan electrodes and signal electrodes, and
      a ferroelectric liquid crystal filled in a space between the groups, the pixels each having a threshold voltage $V_{th}$ and a saturation voltage $V_{sat}$ which vary among the pixels; and
   (b) voltage applying means for achieving a uniform gradational display on said liquid crystal panel regardless of variations in voltage response by different ones of said pixels, said voltage applying means having
      (1) first means for applying to said matrix of electrodes a voltage $V_4$ of one polarity and a magnitude greater than $V_{sat(max)}$ so as to be sufficient to reset all pixels of said matrix of electrodes to one optical state, wherein maximum values of the threshold voltage $V_{th}$ and saturation voltage $V_{sat}$ for all the pixels are defined as $V_{th(max)}$ and $V_{sat(max)}$, respectively, and a minimum value of the threshold voltage $V_{th}$ for all the pixels is defined as $V_{th(min)}$,
      (2) second means for applying to said matrix of electrodes a voltage $V_3$ which causes a pixel having the highest threshold voltage to assume a transmittance $T_1$ % in a first intermediate optical state between the one optical state and another optical state and which reverses to the other optical state a pixel having the lowest threshold voltage, wherein $V_3$ is a voltage of another polarity opposite to the one polarity and satisfies the relation:

$V_{th(max)} < V_3 < V_{sat(max)}$, (3) third means for applying to said matrix of electrodes a voltage $V_2$ which causes the pixel having the lowest threshold voltage to assume a transmittance $(100-T_2)$ % in a second intermediate optical state between the one optical state and the other optical state, wherein $V_2$ is a voltage of the one polarity and satisfies the relation:

$V_{th(min)} \leq V_2 < V_{th(max)}$, and (4) fourth means for applying to said matrix of electrodes a voltage $V_1$ having a magnitude sufficient to change the transmittance $(100-T_2)$ % of the pixel having the lowest threshold voltage to the transmittance $T_1$ %, wherein $V_1$ is a voltage of the other polarity, whereby uniform gradation display can be performed regardless of differences in threshold and saturation voltages.

2. A display apparatus comprising:
   (a) a display panel having
      a matrix of electrodes composed of a group of scan electrodes and a group of signal electrodes, said groups being arranged in a spaced and crossed relationship to define pixels at crossed portions of the scan electrodes and signal electrodes, and
      a ferroelectric liquid crystal filled in a space between the groups, the pixels each having a threshold voltage $V_{th}$ and a saturation voltage $V_{sat}$ which vary among the pixels; and
   (b) voltage applying means for achieving a uniform gradational display on said crystal panel regardless of variations in voltage response by different ones of said pixels, said voltage applying means having
      (1) first means for applying to said matrix of electrodes a voltage $V_4$ of one polarity and a magnitude greater than $V_{sat(max)}$ so as to be sufficient to reset all pixels of said matrix electrode to one optical state, wherein maximum values of the threshold voltage $V_{th}$ and saturation voltage $V_{sat}$ for all the pixels are defined as $V_{th(max)}$ and $V_{sat(max)}$, respectively, and a minimum value of the threshold voltage $V_{th}$ for all the pixels is defined as $V_{th(min)}$,
      (2) second means for applying to said matrix of electrodes a voltage $V_3$ which causes a pixel having the highest threshold voltage to assume a transmittance $T_1$ % in a first intermediate optical state between the one optical state and another optical state and reverses to the other optical state a pixel having the lowest threshold voltage, wherein $V_3$ is a voltage of another polarity opposite to the one polarity and satisfies the relation:

$V_{th(max)} < V_3 < V_{sat(max)}$, (3) third means for applying to said matrix of electrodes a voltage $V_2$ which causes the pixel having the lowest threshold voltage to assume a transmittance $(100-T_2)$ % in a second intermediate optical state between the one optical state and the other optical state, wherein $V_2$ is a voltage of the one polarity and satisfies the following relation:

$V_{th(min)} \leq V_2 < V_{th(max)}$, and (4) fourth means for applying to said matrix of electrodes a voltage $V_1$ having a magnitude sufficient to change the transmittance $(100-T_2)$ % of the pixel having the lowest threshold voltage to the transmittance $T_1$ %, wherein $V_1$ is a voltage of the other polarity, whereby uniform gradation display can be performed regardless of differences in the threshold and saturation voltages.

3. A display apparatus comprising:
   (a) a display panel having
      a matrix of electrodes composed of a group of scan electrodes and a group of signal electrodes, said groups being arranged in a spaced and crossed relationship to define pixels at crossed portions of the scan electrodes and signal electrodes, and
      a ferroelectric liquid crystal filled in a space between the groups, the pixels each having a threshold voltage $V_{th}$ and a saturation voltage $V_{sat}$ which vary among the pixels; and
   (b) voltage applying means for achieving a uniform gradational display on said crystal panel regardless of variations in voltage response by different ones of said pixels, said voltage applying means having (1) first means for applying to said matrix of electrodes a voltage $V_4$ of one polarity and magnitude greater than $V_{sat(max)}$ so as to be sufficient to reset all pixels of said matrix of electrodes to one optical state, wherein maximum values of the threshold voltage $V_{th}$ and saturation voltage $V_{sat}$ for all the pixels are defined as $V_{th(max)}$ and $V_{sat(max)}$, respectively, and a minimum value of the threshold voltage $V_{th}$ for all the pixels is defined as $V_{th(min)}$, (2) second means for applying to said matrix of electrodes a voltage $V_3$ which causes a pixel having the highest threshold voltage to assume a transmittance $T_1$ % in a first intermediate optical state between the one optical state and another optical state and reverses to the other optical state the pixel having the lowest threshold voltage, wherein $V_3$ is a voltage of another polarity opposite to the one polarity and satisfies the relation:

$$V_{th(max)} < V_3 < V_{sat(max)},$$

(3) third means for applying to said matrix of electrodes a voltage $V_2$ which causes a pixel having the lowest threshold voltage to assume a transmittance $(100-T_2)$ % in a second intermediate optical state between the one optical state and the other optical state, wherein $V_2$ is a voltage of the one polarity and satisfies the relation:

$$V_{th(min)} \leq V_2 < V_{th(max)}, \text{ and}$$

(4) fourth means for applying to said matrix of electrodes a voltage $V_1$ having a magnitude sufficient to change the transmittance $(100-T_2)$ % of the pixel having the lowest threshold voltage to the transmittance $T_1$ %, wherein $V_1$ is a voltage of the other polarity; and (c) control means for controlling said voltage applying means to determine amplitudes and pulse widths of the voltages $V_1$, $V_2$ and $V_3$ in accordance with image information, whereby uniform gradation display can be performed regardless of differences in threshold and saturation voltages.

4. A display apparatus according to claim 3, wherein said image information comprises gradation information.

5. A method of driving a liquid crystal apparatus comprising a liquid crystal panel having a matrix of electrodes composed of a group of scan electrodes and a group of signal electrodes, the groups being arranged in a spaced and crossed relationship to define pixels at crossed portions of the scan electrodes and signal electrodes, and a ferroelectric liquid crystal filled in a space between the groups, the pixels each having a threshold voltage $V_{th}$ and a saturation voltage $V_{sat}$ which vary among the pixels, for achieving a uniform gradational display on the liquid crystal panel regardless of variations in voltage response by different ones of the pixels, said method comprising the steps of:

applying to said matrix of electrodes a voltage $V_4$ of one polarity and magnitude greater than $V_{sat(max)}$ so as to be sufficient to reset all pixels of said matrix of electrodes to one optical state, wherein maximum values of the threshold voltage $V_{th}$ and saturation voltage $V_{sat}$ for all the pixels are defined as $V_{th(max)}$ and $V_{sat(max)}$, respectively, and minimum value of the threshold voltage $V_{th}$ for all the pixels is defined as $V_{th(min)}$;

applying to said matrix of electrodes a voltage $V_3$ which causes a pixel having the highest threshold voltage to assume a transmittance $T_1$ % in a first intermediate optical state between the one optical state and another optical state and reverses to the other optical state the pixel having the lowest threshold voltage, wherein $V_3$ is a voltage of another polarity opposite to the one polarity and satisfies the relation:

$$V_{th(max)} < V_3 < V_{sat(max)},$$

applying to said matrix of electrodes a voltage $V_2$ which causes a pixel having the lowest threshold voltage to assume a transmittance $(100-T_2)$ % in a second intermediate optical state between the one optical state and the other optical state, wherein $V_2$ is a voltage of the one polarity and satisfies the relation:

$$V_{th(min)} \leq V_2 < V_{th(max)}, \text{ and}$$

applying to said matrix of electrodes a voltage $V_1$ having a magnitude sufficient to change the transmittance $(100-T_2)$ % of the pixel having the lowest threshold voltage to the transmittance $T_1$ %, wherein $V_1$ is a voltage of the other polarity, whereby uniform gradation display can be performed regardless of differences in threshold and saturation voltages.

6. A method of driving a pixel in a liquid crystal device in which a plurality of pixels are arranged, the pixel having a liquid crystal, which can exhibit either one of two orientation states in accordance with a polarity of an applied electric field, and a pair of electrodes for applying the electric field to the liquid crystal, said method comprising the steps of:

a) applying to the pixel a first voltage signal of one polarity having a value of $V_4$ not less than $V_{sat}$, where $V_{sat}$ is an inversion saturation value at which the pixel is fully inverted to one of the orientation states under a predetermined environmental condition;

b) after said step a), applying to the pixel a second voltage signal of another polarity opposite to the one polarity, having a value of $V_3$ in accordance with gradation information and satisfying a relationship of $V_{th} \leq V_3 \leq V_{sat}$, where $V_{th}$ is an inversion threshold value at which the pixel begins to invert to the one orientation state under the predetermined environmental condition;

c) after said step b), applying to the pixel a third voltage signal of the one polarity having a value of $V_2$ equal to $V_{th}$; and d) after said step c), applying to the pixel a fourth voltage signal of the other polarity having a value of $V_3 \times V_{th}/V_{sat}$.

7. A method according to claim 6, wherein each of the voltage signals is a pulse signal having a pulse amplitude and a pulse width, each of said values being equal to a product of the respective pulse amplitude and pulse width and set by pulse amplitude modulation.

8. A method according to claim 6, wherein each of the voltage signals is a pulse signal having a pulse amplitude and a pulse width, each of said values being equal to a product of the respective pulse amplitude and pulse width and set by pulse width modulation.

9. A method according to claim 6, further comprising the steps of:

e) after said step d), applying to the pixel a fifth voltage signal of the one polarity having a value $V_5$ of $V_{th}^2/V_{sat}$, and f) after said step e), applying to the pixel a sixth voltage signal of the other polarity having a value $V_6$ of $$\frac{V_{th}}{V_{sat}^2} \times V_3.$$

10. A method of driving a pixel in a liquid crystal device in which a plurality of pixels are arranged, the pixel having a liquid crystal, which can exhibit either one of two orientation states in accordance with a polarity of an applied electric field, and a pair of electrodes for applying the electric field to the liquid crystal, said method comprising the steps of:

a) applying to the pixel a first voltage signal of one polarity having a value of $V_A$ not less than $V_{sat}$, where $V_{sat}$ is an inversion saturation value at which the pixel is fully inverted to one of the orientation states under a predetermined environmental condition; and b) after said step a), applying voltage signals having a value $V_i$ to the pixel in an order i=1, 2, 3, . . .

where, when i is odd number, $$V_i = V_{sat} \cdot \left(\frac{V_{th}}{V_{sat}}\right)^{(i-1)/2},$$

and when i is even number, $$V_i = V_{sat} \cdot \frac{1}{\left(\frac{V_{th}}{V_{sat}}\right)^{(n-(i/2))}},$$

wherein $V_{th}$ is an inversion threshold value at which the pixel beins to invert under the predetermined environmental condition and n is a constant determined on the basis of gradation information.

\* \* \* \* \*

UNITED STATES PATENT AND TRADEMARK OFFICE
CERTIFICATE OF CORRECTION

PATENT : 5,508,711

DATED : April 16, 1996

INVENTOR(S): SHINJIRO OKADA

It is certified that error appears in the above-identified patent and that said Letters Patent is hereby corrected as shown below:

On the title page :

Item [56] REFERENCES CITED

U.S. Patent Documents,
    insert --5,026,144 6/1991 Taniguchi et al;

4,778,260 10/1988 Okada et al.--.

Foreign Patent Documents,
    insert --57882 11/1980 Australia;

58606 12/1980 Australia;

61-94023 5/1986 Japan--.

Other Publications,
    insert --Clark et al., "Molecular Crystals and Liquid
        Crystals, "Vol. 94, pp. 213-233 (1988)--.

UNITED STATES PATENT AND TRADEMARK OFFICE
CERTIFICATE OF CORRECTION

PATENT : 5,508,711
DATED : April 16, 1996
INVENTOR(S) : SHINJIRO OKADA

It is certified that error appears in the above-identified patent and that said Letters Patent is hereby corrected as shown below:

COLUMN 5

Line 28, "State" should read --state--.

Signed and Sealed this

First Day of October, 1996

Attest:

BRUCE LEHMAN

*Attesting Officer*　　　　　　　*Commissioner of Patents and Trademarks*